(12) United States Patent
Riddiford et al.

(10) Patent No.: US 8,792,947 B2
(45) Date of Patent: Jul. 29, 2014

(54) MOBILE DEVICE (75) Inventors: Martin Riddiford, London (GB); Julia Allwright, London (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/219,087

(22) Filed: Aug. 26, 2011

(65) Prior Publication Data
US 2012/0046081 A1 Feb. 23, 2012

Related U.S. Application Data (63) Continuation-in-part of application No. 12/860,609, filed on Aug. 20, 2010, now Pat. No. 8,660,621.

(51) Int. Cl.
*H04M 1/00* (2006.01)

(52) U.S. Cl.
USPC ...................................... 455/575.3

(58) Field of Classification Search
USPC ...................................... 455/575.3
See application file for complete search history.

(56) References Cited

U.S. PATENT DOCUMENTS

| | | | | |
|---|---|---|---|---|
| 7,353,568 B2 * | 4/2008 | Duan et al. | ......................... | 16/330 |
| 2004/0264118 A1 | 12/2004 | Karidis | | |
| 2007/0234521 A1 * | 10/2007 | Komppa | .......................... | 16/366 |
| 2007/0243896 A1 | 10/2007 | Maatta et al. | | |
| 2008/0276423 A1 * | 11/2008 | Wu | .................................. | 16/277 |
| 2010/0304799 A1 * | 12/2010 | Leung et al. | ............... | 455/575.3 |

FOREIGN PATENT DOCUMENTS

| | | |
|---|---|---|
| EP | 1939470 A1 | 7/2008 |
| EP | 2226991 A1 | 9/2010 |
| EP | 2161906 A1 | 3/2012 |
| JP | 2005-275964 A | 10/2005 |
| WO | 02/17051 A1 | 2/2002 |
| WO | 2006/115144 A1 | 11/2006 |
| WO | 2006/120300 A1 | 11/2006 |
| WO | 2010/028394 A1 | 3/2010 |

OTHER PUBLICATIONS

Extended European Search Report from related European Patent Application No. 12165600.3 dated Dec. 20, 2012; 8 pages.

* cited by examiner

*Primary Examiner* — Olumide T Ajibade Akonai
*Assistant Examiner* — Natasha Cosme
(74) *Attorney, Agent, or Firm* — Fitch, Even, Tabin & Flannery LLP (57) ABSTRACT

A mobile device includes a first housing, a second housing, and a hinge assembly rotatably coupling the first housing to the second housing and enabling movement of the device between an open configuration and a closed configuration. The hinge assembly includes a pair of link arm assemblies each including a first linkage arm configured for engaging the first housing and a second linkage arm configured for engaging the second housing. When the device is in the open configuration, the first housing is planar with the second housing.

20 Claims, 11 Drawing Sheets

MOBILE DEVICE

CROSS-REFERENCE TO RELATED APPLICATIONS

The present application is a continuation-in-part of commonly owned and co-pending U.S. patent application Ser. No. 12/860,609 for a MOBILE DEVICE, filed on Aug. 20, 2010 and currently pending with the United States Patent and Trademark Office.

BACKGROUND OF THE DISCLOSURE

This disclosure is directed to personal communication devices, and more specifically to a hinge assembly for a mobile or handheld electronic device.

Mobile devices are generally utilized for both business and personal use, and are typically two-way communication devices that offer voice and data communication, such as email and text messaging. Additional features such as Internet browsing, navigation systems and calendar applications are also available on some conventional devices.

Conventional mobile devices can come in several form factors, such as candy bar, slider, and clamshell or flip-style. Clamshell devices typically include an upper housing, a lower housing and a hinge or connector assembly that enables the upper housing to rotate relative to the lower housing for opening and closing of the device. When the device is in an open configuration, the upper and lower housings are typically offset from or overlap each other, with the upper housing being arranged at an oblique angle relative to the lower housing. Such a configuration can limit the size of the input devices provided on inner surfaces of the upper and lower housings. Specifically, due to the overlap of one of the housings onto the other of the housings, one of the input devices may need to be reduced in size to fit on the housing and not be obstructed by the overlapping housing. Further, due to the construction of some conventional hinge assemblies, when the device is in the open configuration, the upper and lower housings are separated by the hinge assembly such that an input device on the upper housing may not be able to extend onto the lower housing and vice versa.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The mobile device can be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIG. 1, which shows a simplified block diagram of components of a mobile device 100 according to one embodiment.

Figure 1:
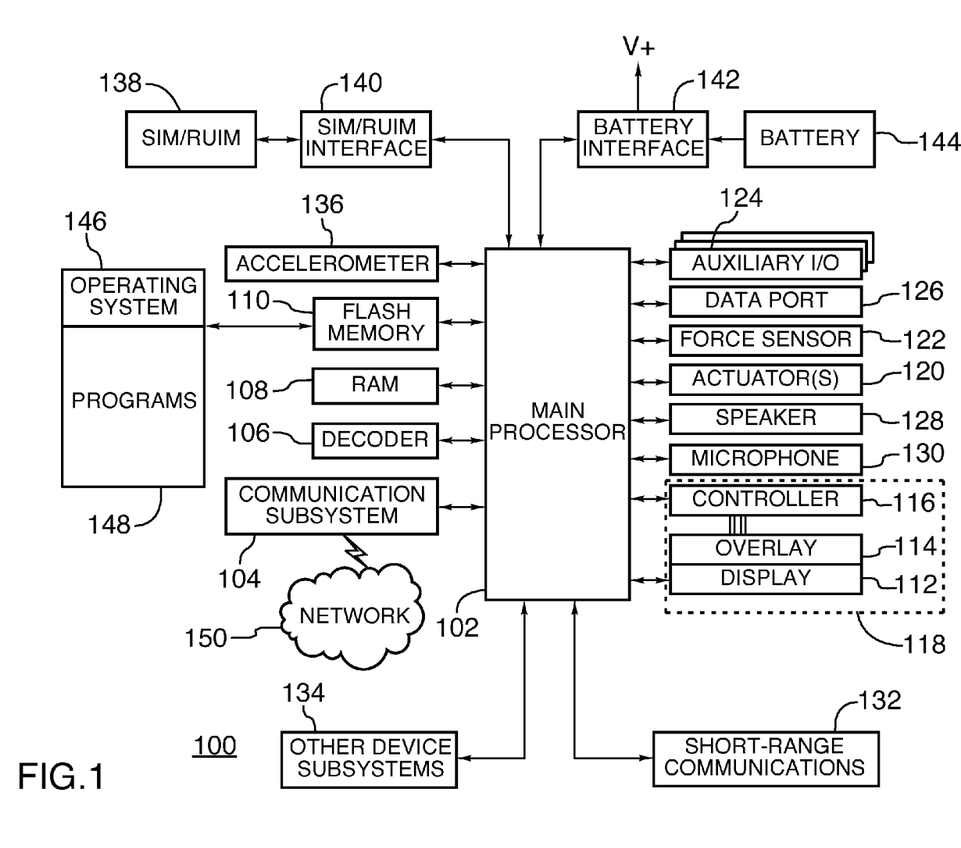
FIG. 1 is a block diagram showing the components of a mobile device in accordance with the present disclosure.

The device 100 includes multiple components such as a processor 102 that controls the operations of the device. Communication functions, including data communications, voice communications, or both may be performed through a communication subsystem 104. Data received by the device 100 is decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The device 100 may be a battery-powered device and as shown includes a battery interface 142 for receiving one or more rechargeable batteries 144.

The processor 102 generally interacts with subsystems such as, for example, a Random Access Memory (RAM) 108, a flash memory 110, a display 112 (which may have a touch-sensitive overlay 114 connected to an electronic controller 116 that together comprise a touch-sensitive display 118), an actuator assembly such as a keyboard 120, one or more optional force sensors 122, an auxiliary input/output (I/O) subsystem 124, a data port 126, a speaker 128, a microphone 130, short-range communications 132 and other device subsystems 134.

User-interaction with a graphical user interface of the display 112 may be performed through the touch-sensitive overlay 114. The processor 102 interacts with the touch-sensitive overlay 114 via the electronic controller 116.

Information, such as text, characters, symbols, images, icons, and other items may be displayed or rendered on the touch-sensitive display 118 via the processor 102.

The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the device 100 may use a Subscriber Identity Module or a Removable User Identity Module (SIM/

RUIM) card 138 inserted into a SIM/RUIM interface 140 for communication with a network, such as the wireless network 150.

Alternatively, user identification information may be programmed into the flash memory 110.

The device 100 also includes an operating system 146 and software components or programs 148 that are executed by the processor 102 and which may be stored in a persistent store such as the flash memory 110. Additional applications may be loaded onto the device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the device 100 is similar. The speaker 128 outputs audible information converted from electrical signals, and the microphone 130 converts audible information into electrical signals for processing.

Referring next to FIGS. 2-11, the mobile device 100 may be a clamshell-type device configurable between a closed and an open configuration. The device 100 may include a first or upper housing 152 rotatably coupled to a second or lower housing 154 by a hinge or connector assembly 156. In the present device 100, the upper housing 152 has a thickness that is less than that of the lower housing 154, although it is recognized that the lower housing could be thinner than the upper housing in some cases, to suit the application. In the present device 100, the upper housing 152 and lower housing 154 have differing thicknesses to ensure proper functionality of the hinge assembly 156 as the device is opened and closed.

Figure 8:
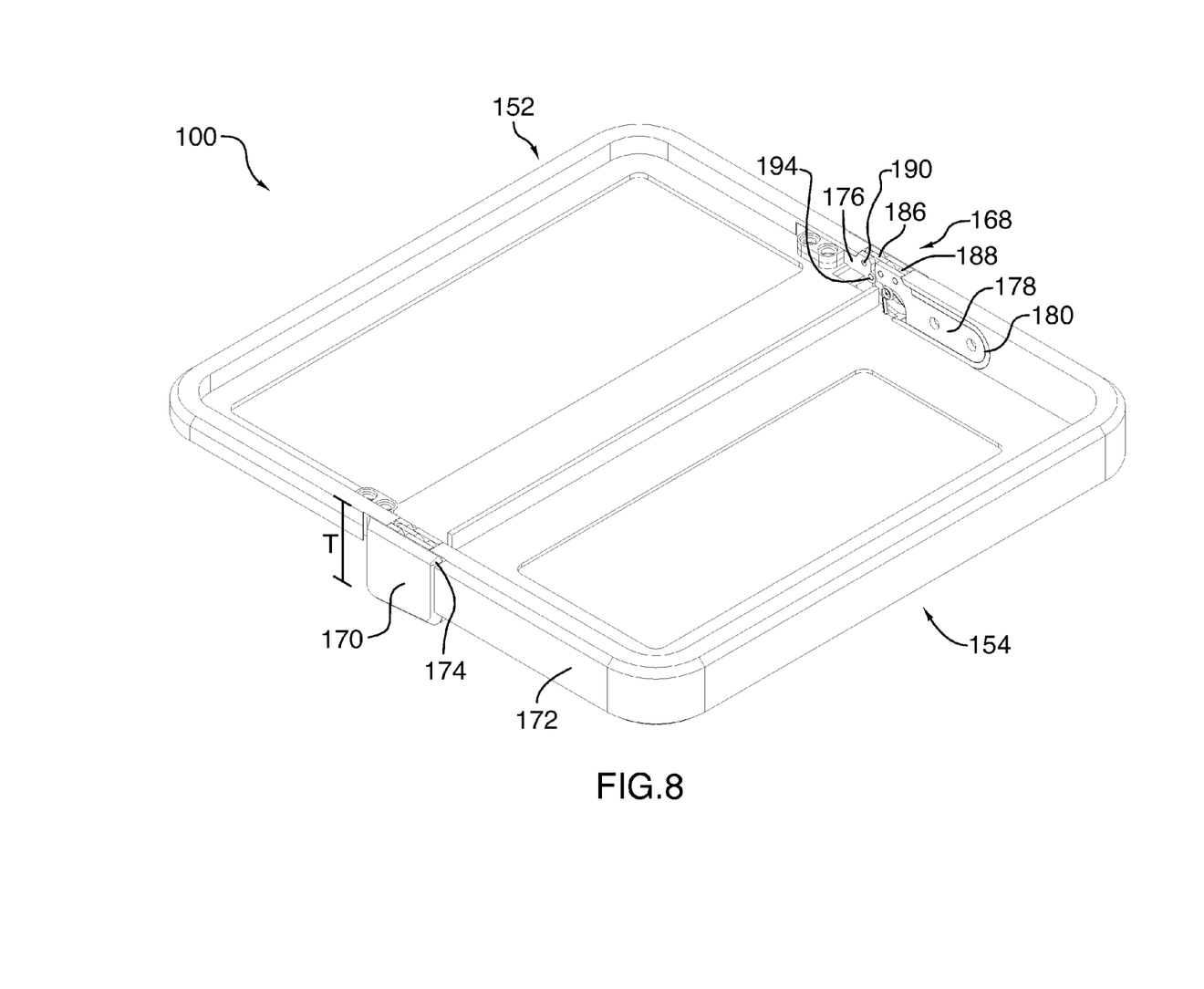
FIG. 8 is a front perspective view of the mobile device in an open configuration.

The upper and lower housings 152, 154 rotate relative to each other between the closed (FIG. 2) and the open (FIG. 8) configurations such that when the device 100 is in the open configuration, the upper housing 152 is planar with the lower housing 154. More specifically and as will be described in further detail below, the hinge assembly 156 enables the device 100 to open and close similar to a book being opened and closed. From the closed configuration in FIG. 2, the upper housing 152 rotates approximately 180° to provide a substantially flat and planar surface when the device 100 is in the open configuration. As shown in FIG. 8, when the device 100 is in the open configuration, the upper housing 152 and lower housing 154 define an approximately 180° angle relative to each other.

Figure 5:
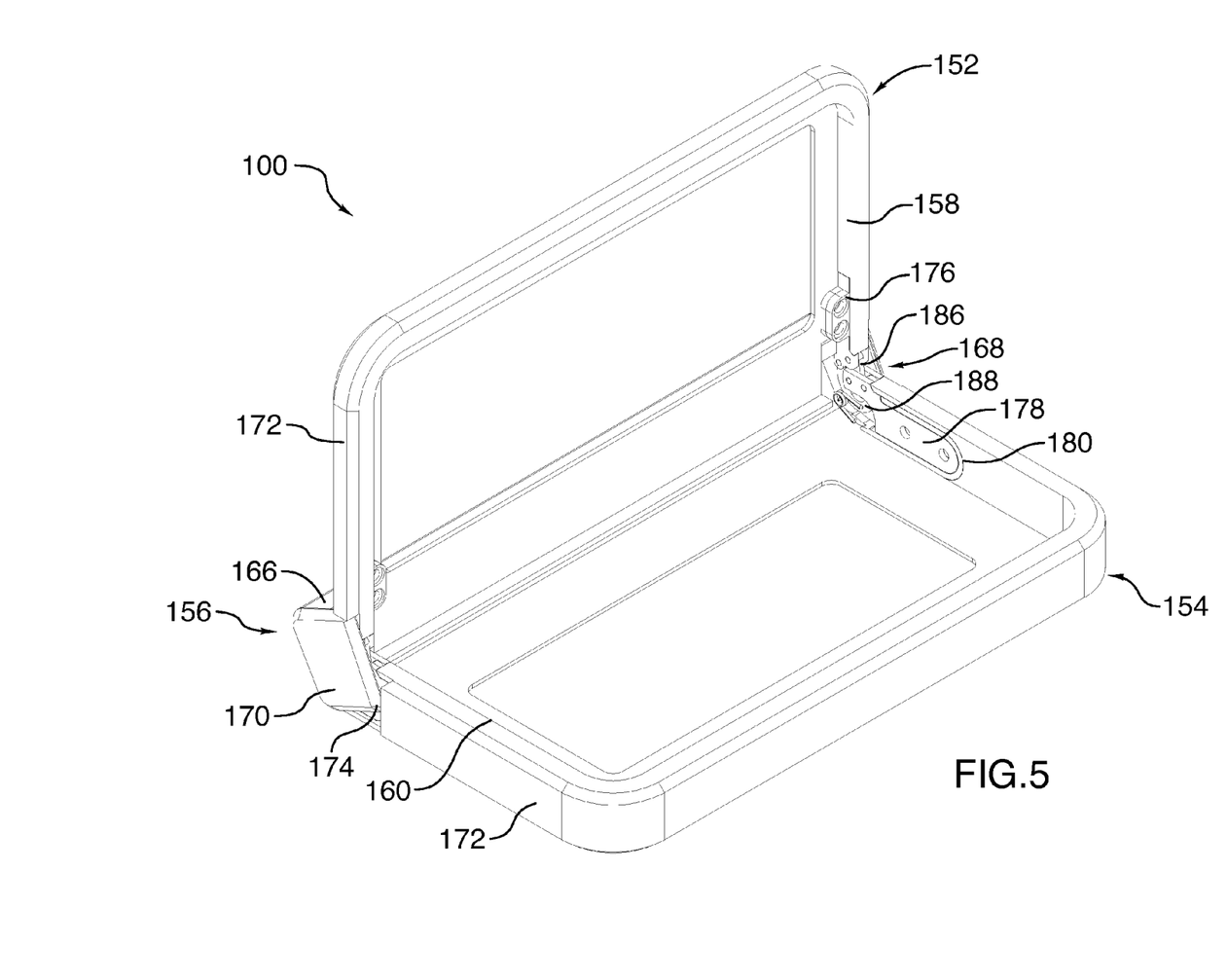
FIG. 5 is a front perspective view of the mobile device in an intermediate configuration.

As seen in FIGS. 5 and 8, the upper housing 152 can include an inner face 158 and the lower housing 154 can also include an inner face 160; each of the inner faces 158, 160 can include an input device (not shown). For example, the device 100 in FIG. 3 can include the touch sensitive display 118 (not shown) provided on the upper housing inner face 158, and the keyboard 120 or a virtual keyboard (not shown) provided on the lower housing inner face 160. However, it is appreciated that the device 100 is not limited to such a configuration. For example, one or both of the inner faces 158, 160 could include a touch sensitive display, or could further include an auxiliary input device (not shown) such as an optical trackpad, trackball, joystick, and the like. Alternatively and as will be described in further detail below, a single touch-sensitive display could be provided that extends across the hinge assembly 156 and onto both upper and lower housings 152, 154 (not shown), or one of the housings could include a display that extends onto the hinge assembly (also not shown). Further, an outer face 162 of the upper housing 152 could also include a display (not shown) or other input device for use when the device 100 is in the closed configuration.

When the device 100 is in the open configuration, the upper housing inner face 158 is arranged at approximately 180° relative to the lower housing inner face 160. It is contemplated that this configuration provides more space for the input devices and therefore allows for larger sized input devices than those in conventional clamshell devices. Specifically, conventional clamshell devices typically include either an overlap between the upper and lower housings or a bulky hinge portion located between the upper and lower housings. Such a configuration can limit the space available on the housings for input devices such as keyboards, displays and navigation devices. Since the present device 100 does not include either an overlap or a hinge portion separating the inner faces of the upper and lower housings, it is contemplated that the present device 100 can include larger sized input devices than those in conventional clamshell devices, while maintaining an overall reduced size form factor.

A gap 164 (FIGS. 4 and 7) is defined between the upper and lower housings 152, 154, and is present whether the device 100 is in the open or the closed configurations. Although other dimensions may be appropriate, the gap 164 is approximately 0.5 mm wide. Due to the construction and movement of the hinge assembly 156 (described in further detail below), the gap 164 remains a substantially constant width regardless of whether the device is open, closed, or transitioning between the open and closed configurations. It is contemplated that due to the relatively small size of the gap 164 and it's constant width, the device 100 could include displays 118 (not shown) on both the upper and lower housing inner faces 158, 160 that act as one, single display when the device is in the open configuration. Alternatively, the displays could be configured such that there is one single display that traverses the gap and extends onto both the upper and lower housings (not shown). As will be described in further detail below, it is also contemplated that the gap 164 provides proper clearance for the upper and lower housings 152, 154 to transition between the open and closed configurations without contacting each other.

Referring next to FIGS. 4, 7, 10 and 11, the hinge assembly 156 is configured for enabling opening and closing of the device 100, and includes a spine 166, at least one link arm assembly 168 and a pair of end caps 170 provided on either end of the spine. The spine 166 extends along a width W (FIG. 3) of the device 100 and, along with the end caps 170, is configured for concealing the link arm assembly 168 after construction of the device 100.

Figure 2:
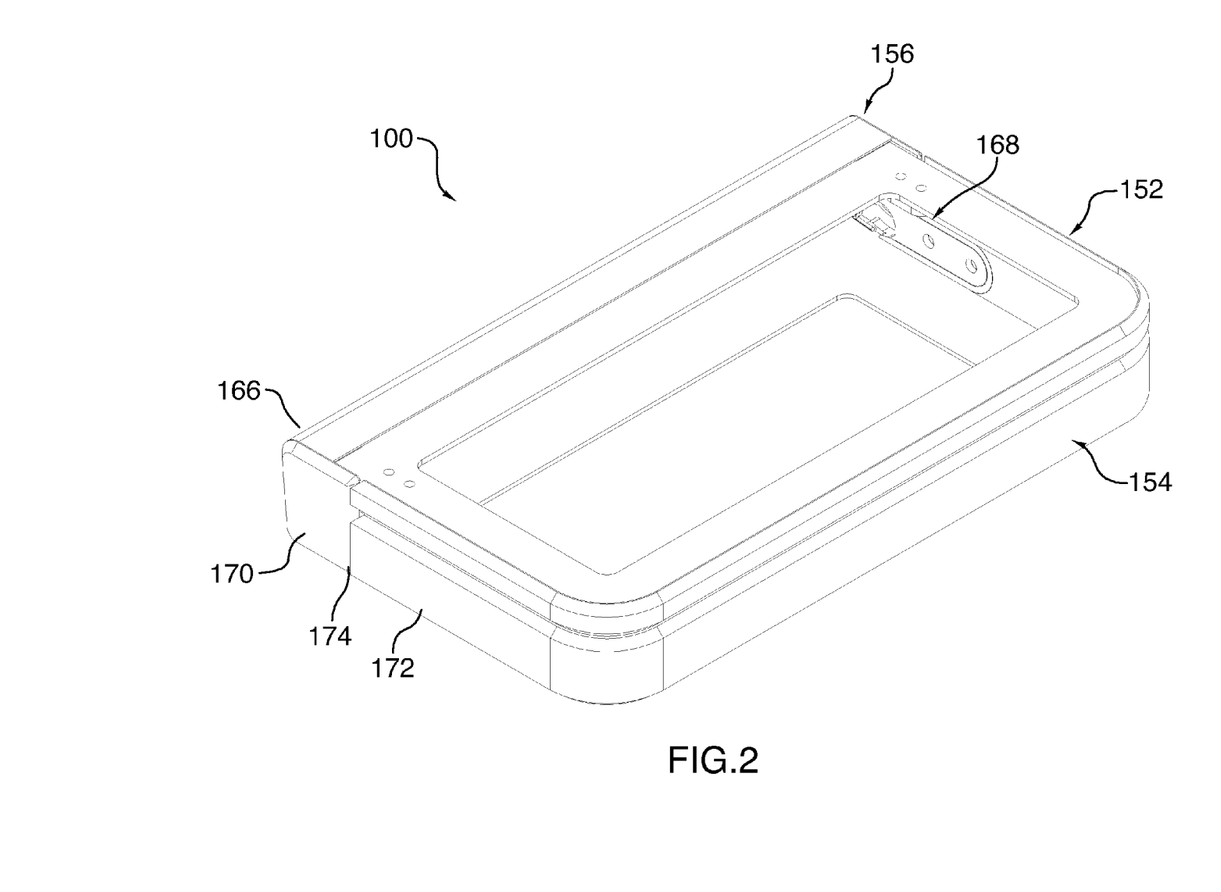
FIG. 2 is a front perspective view of the mobile device in a closed configuration.

In both the closed and the open configurations, the outer surfaces of the end caps 170 are substantially flush with sidewalls 172 of the device 100 (as seen in FIGS. 2 and 8), resulting in the device having a substantially smooth outer surface. In addition, top corners 174 of the end caps 170 are substantially square or sharp, such that when the device 100 is in the open configuration, the corners 174 and top surface of the end caps are planar and flush with the inner surfaces 158, 160 of the upper and lower housings 152, 154, respectively.

In the open configuration, the spine 166 can have a thickness T (FIG. 8) that is greater than that of each of the upper and lower housings 152, 154, such that it can serve as a grip for a user's hands during use. Furthermore, if the user rests the device 100 on a flat or solid surface, the spine 166 can serve as a base or rest for the device such that the device rests at a slightly obtuse angle relative to the solid surface when in the open configuration. It is contemplated that such a resting arrangement can allow the user to efficiently use the device 100 for typing and/or media viewing purposes, among other things.

Referring now in detail to the link arm assembly 168, the present hinge assembly 156 includes a pair of link arm assemblies, each of which include identical components, and accordingly, only one of the link arm assemblies will be described herein. Each link arm assembly 168 is configured for being enclosed or covered by its respective end cap 170. As stated above, the spine 166 and the end caps 170 are configured for enclosing the link arm assemblies 168 and for providing a smooth external appearance to the hinge assembly 156. Best shown in FIG. 11, the link arm assembly 168 includes a first linkage arm 176 configured for attachment to one of the upper and lower housings 152, 154, and a second linkage arm 178 configured for attachment to the other of the upper and lower housings 152, 154. In the present example, the first or upper linkage arm 176 is attached to the upper housing 152 and the second or lower linkage arm is attached to the lower housing 154. The second linkage arm 178 is disposed within a frame 180 that is directly secured to the lower housing 154, as shown in FIG. 5, for example. The frame 180 includes at least one, and in this case, a pair of, pins 182 which protrude from an inner surface of the frame and are configured to engage corresponding pinholes 184 in the second linkage arm 178, thereby retaining the second linkage arm to the frame.

To secure the first and second linkage arms 176, 178 to each other, the link arm assembly 168 further includes a linkage rod 186 and a linkage bar 188. A first end of the linkage rod 186 is secured to the first linkage arm 176 by a corresponding rod pin 190 or similar fastener. To retain the linkage rod 186 to the second linkage arm 178, the linkage rod includes a through-hole 192 at a second, opposite end thereof, configured to be received by one of the pins 182 on the frame 180. During opening and closing of the device 100, the linkage rod 186 pivots about the respective pin 182, as will be described in further detail below. As seen in FIGS. 5 and 8, when the link arm assembly 168 is assembled, the linkage rod 186 is located between the frame 180 and the second linkage arm 178.

The linkage bar 188 is also configured for attachment to both the first and second linkage arms 176, 178. Specifically, a first end of the linkage bar 188 is secured to the first linkage arm 176 by a corresponding bar pin 194 or similar fastener. A second, opposite end of the linkage bar 188 includes a bar through-hole 196 configured for engaging a corresponding one of the pins 182 on the frame 180. The linkage bar 188 pivots about the corresponding pin 182 during opening and closing of the device 100, as will be described in further detail below. Similar to the linkage rod 186, upon assembly of the link arm assembly 168, the linkage bar 188 is sandwiched between the frame 180 and the second linkage arm 178.

As will be described in further detail below, the linkage rod 186 and the linkage bar 188 control the movement of the device 100 between the open and closed configurations. Further, the linkage rod 186 and the linkage bar 188 are co-planar and shaped to "fit together" during opening and closing of the device, enabling smooth movement between the open and closed configurations and a more balanced assembly.

Figure 11:
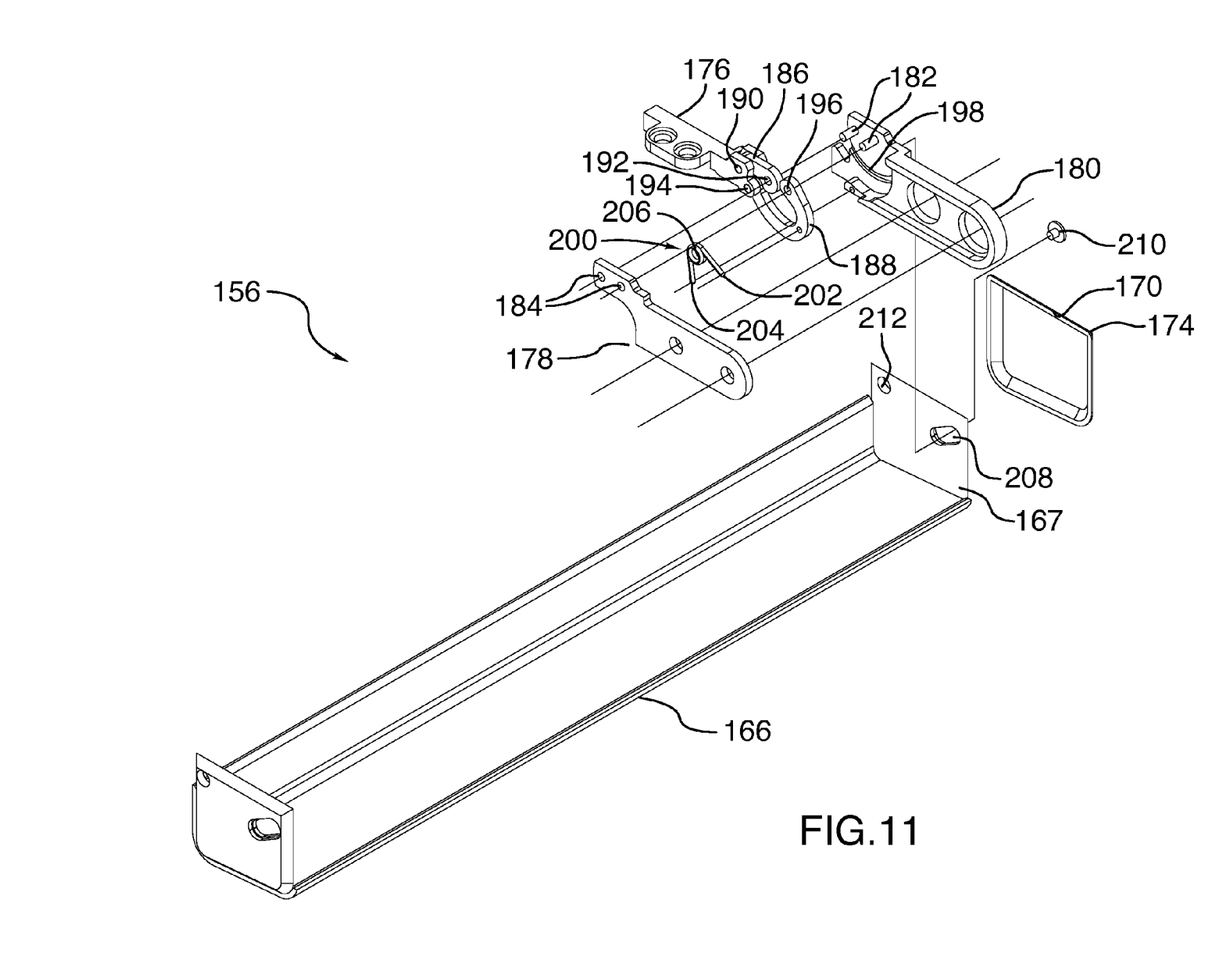
FIG. 11 is an exploded view of the hinge assembly of the mobile device.

Best shown in FIG. 11, the frame 180 defines a groove 198 configured to receive a portion of a biasing member 200. In the present device 100, the biasing member 200 is a spring having a first end 202 configured for attachment to the linkage bar 188, and a second end 204 attached to the frame 180. The groove 198 provides a clearance slot for the spring first end 202 where it passes through and is attached to the linkage bar 188. The spring 200 further includes a central, coiled portion 206 that is fixedly secured to the frame by a screw or other connector (not shown). During opening and closing of the device 100, the second end 204 of the spring 200 remains fixed to the frame 180 and does not move, whereas the first end 202 of the spring biases the linkage bar 188 to pivot about its corresponding pin 182, which will be described in further detail below.

As previously described, the spine 166 and end caps 170 are configured for covering the link arm assembly 168 to provide an aesthetically pleasing and smooth outer surface to the hinge assembly 156. To that end, the spine 166 includes a pair of opposing sidewalls 167, each of which is covered by a corresponding end cap 170. Each sidewall 167 defines a guide slot 208 configured for receiving a corresponding guide pin 210 that passes through the guide slot and engages a guide pinhole (not shown) in an outer face of the frame 180. At an opposing side of the sidewall 167 from the guide slot 208, each end cap sidewall further includes a guide hole 212 configured for receiving a corresponding pin or fastener (not shown) that engages a corresponding opening (not shown) in the upper housing 152 to secure the spine to the upper housing.

During opening and closing of the device 100, the guide pin 210 moves along the guide slot 208 to maintain proper alignment between the upper housing 152, the lower housing 154 and the spine 166. It is contemplated that the placement of the guide slot 208 and the guide hole 212 enable the device 100 to transition smoothly between the open and closed configurations. Specifically, the configuration of the guide slot 208 and the guide hole 212 ensure that the upper housing 152, the lower housing 154 and the spine 166 maintain a flush arrangement when the device is in the open and closed configurations.

Figure 3:
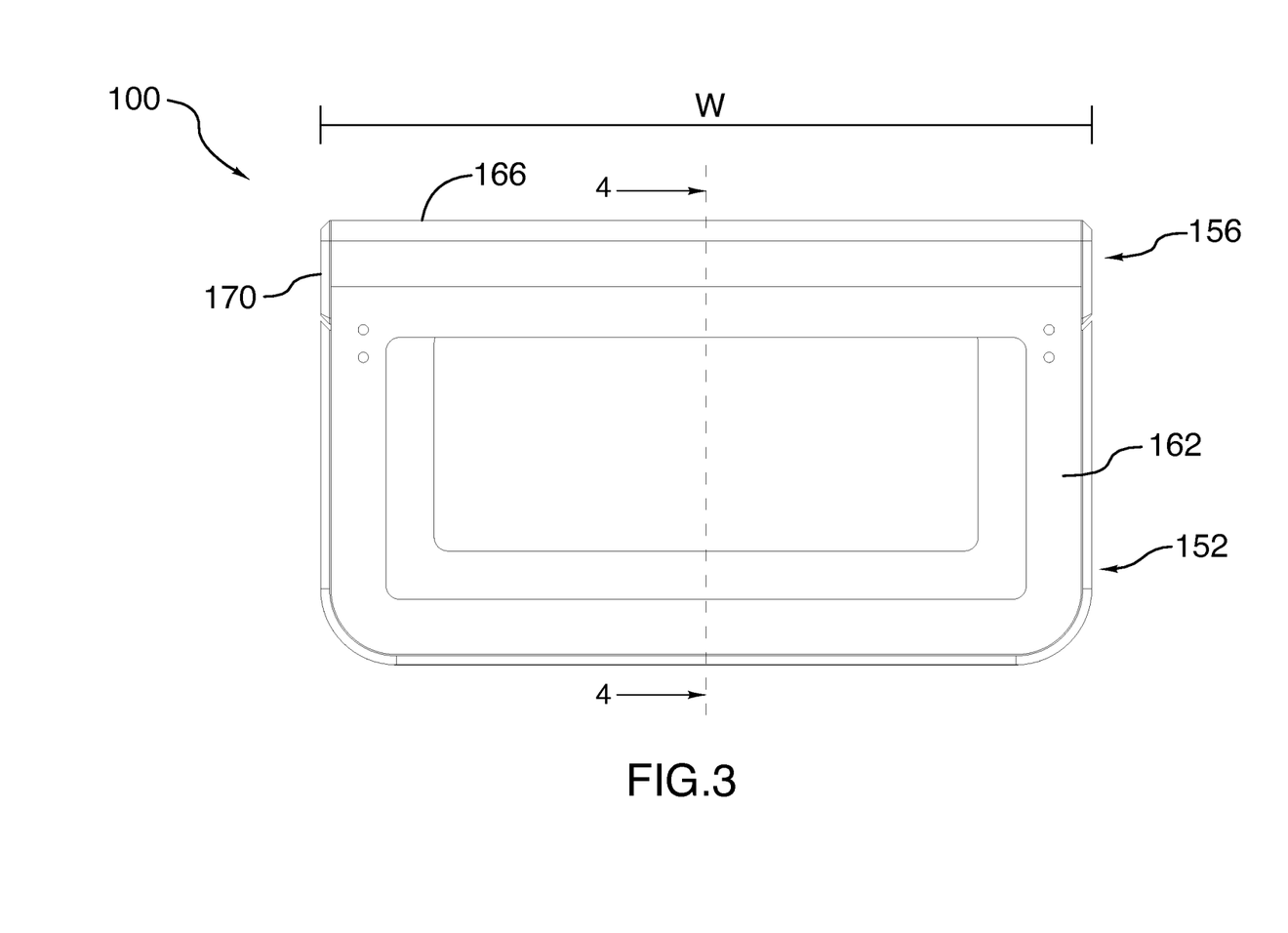
FIG. 3 is a top plan view of the mobile device of FIG. 2.
Figure 4:
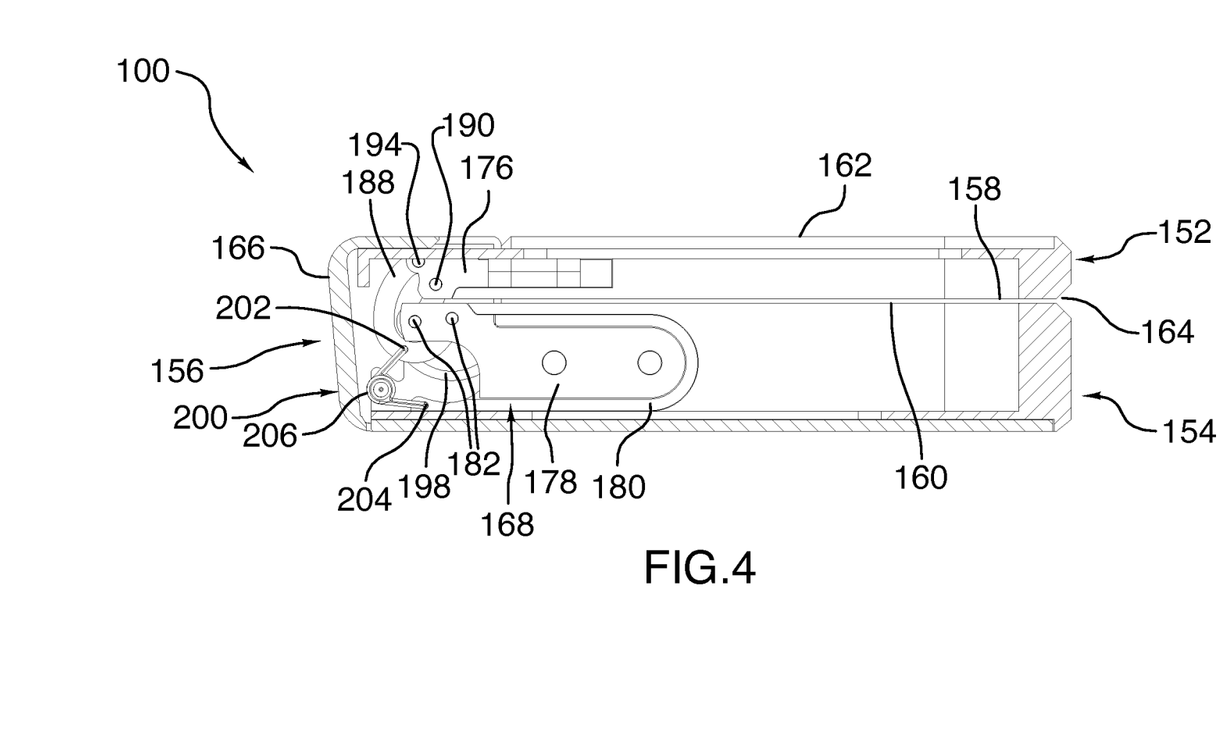
FIG. 4 is a cross-sectional side view of the mobile device taken along line 4-4 of FIG. 3 and in the direction indicated.

The behavior of the hinge assembly 156 as the device 100 is opened and closed will now be described in further detail. When the device 100 is in the closed configuration, as seen in FIGS. 2-4, the inner faces 158, 160 of the upper and lower housings 152, 154 face towards each other and are substantially parallel. Further, in the closed configuration, the first linkage arm 176 and the second linkage arm 178 are substantially parallel to each other, the spring 200 is in a tension state to maintain the fully closed configuration, and the first end 202 of the spring resides near a first or upper end of the clearance slot defined by the groove 198. While in the closed configuration, the linkage rod 186 is arranged at an angle relative to the first and second linkage arms 176, 178, and is configured to "nest" or fit within the linkage bar 188, as shown in FIG. 4.

Figure 6:
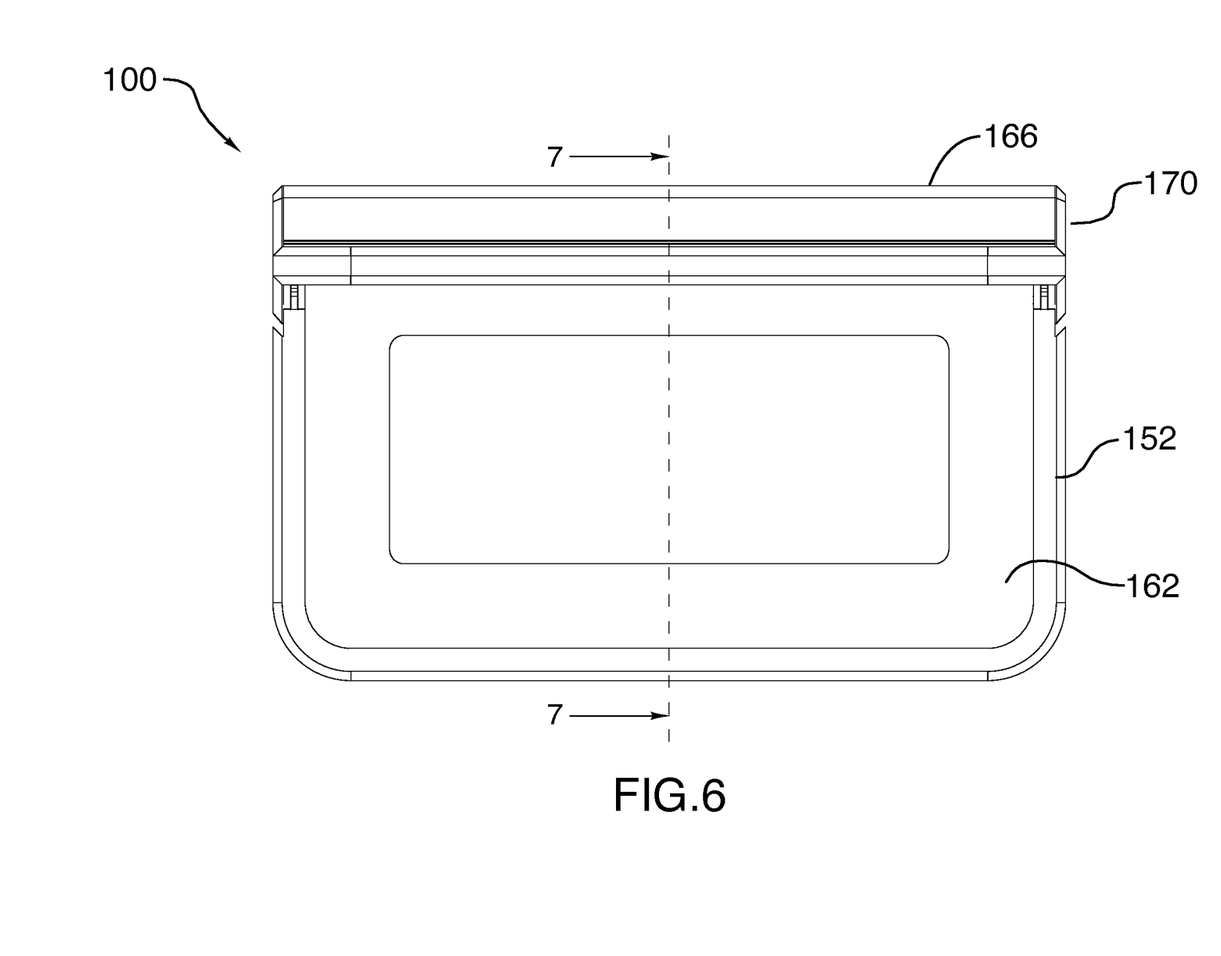
FIG. 6 is a top plan view of the mobile device of FIG. 5.
Figure 7:
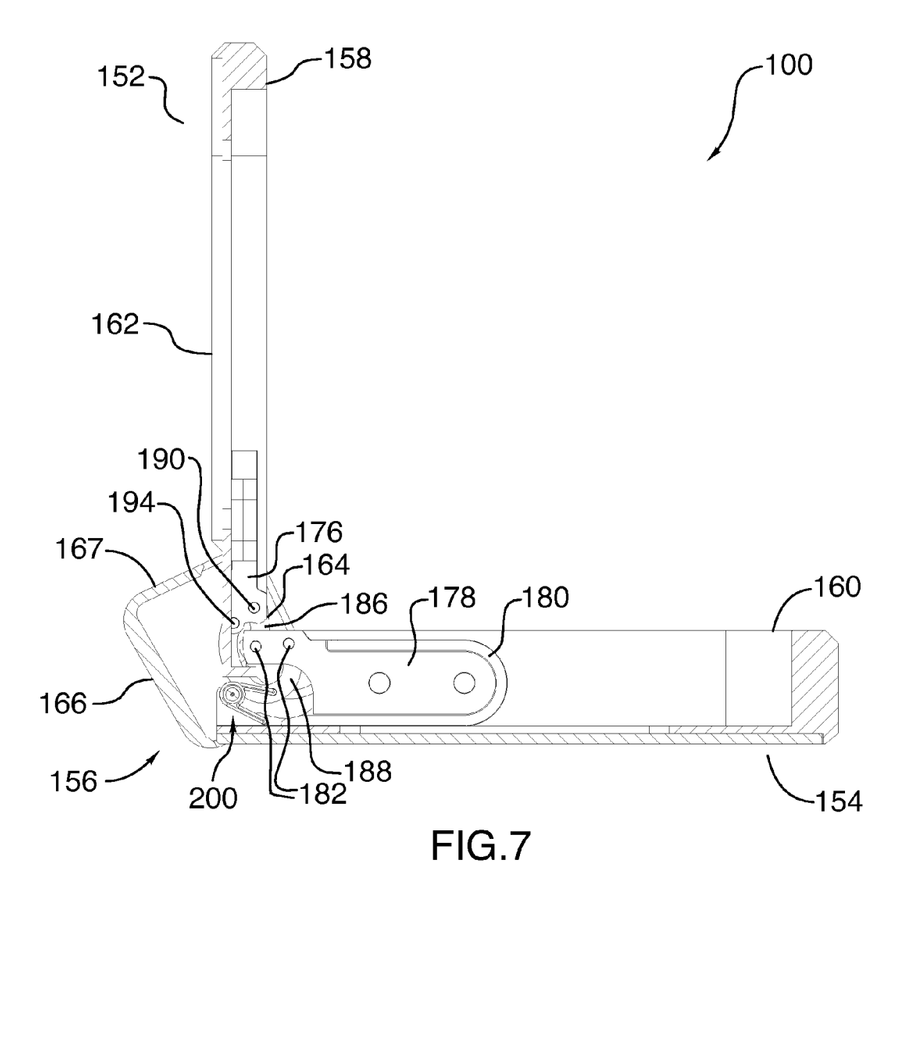
FIG. 7 is a cross-sectional side view of the mobile device taken along line 7-7 of FIG. 6 and in the direction indicated.

As the device 100 is moved from the closed configuration to the open configuration, an intermediate configuration where the upper and lower housings 152, 154 are substantially perpendicular to each other is shown in FIGS. 5-7. As the device 100 is opened, the first linkage arm 176 pivots about the rod pin 190 and the bar pin 194, continued movement of which causes the linkage rod 186 and the linkage bar 188 to pivot about their corresponding pivot axes defined by the pins 182. The movement of the linkage bar 188 drives the first end 202 of the spring 200 to move within the clearance slot defined by the groove 198 in a direction toward the second linkage arm 178, increasing the tension state of the spring 200 and enabling a smooth and controlled movement between the open and closed configurations. As the linkage rod 186 pivots about its corresponding pivot axis defined by its pin 182, the first linkage arm 176 continues to move away from the second linkage arm 178 such that the first linkage arm is arranged substantially perpendicular to the second linkage arm. In the intermediate configuration, the linkage rod 186 is substantially perpendicular to the second linkage arm 178, but is substantially parallel to the first linkage arm 176.

Figure 9:
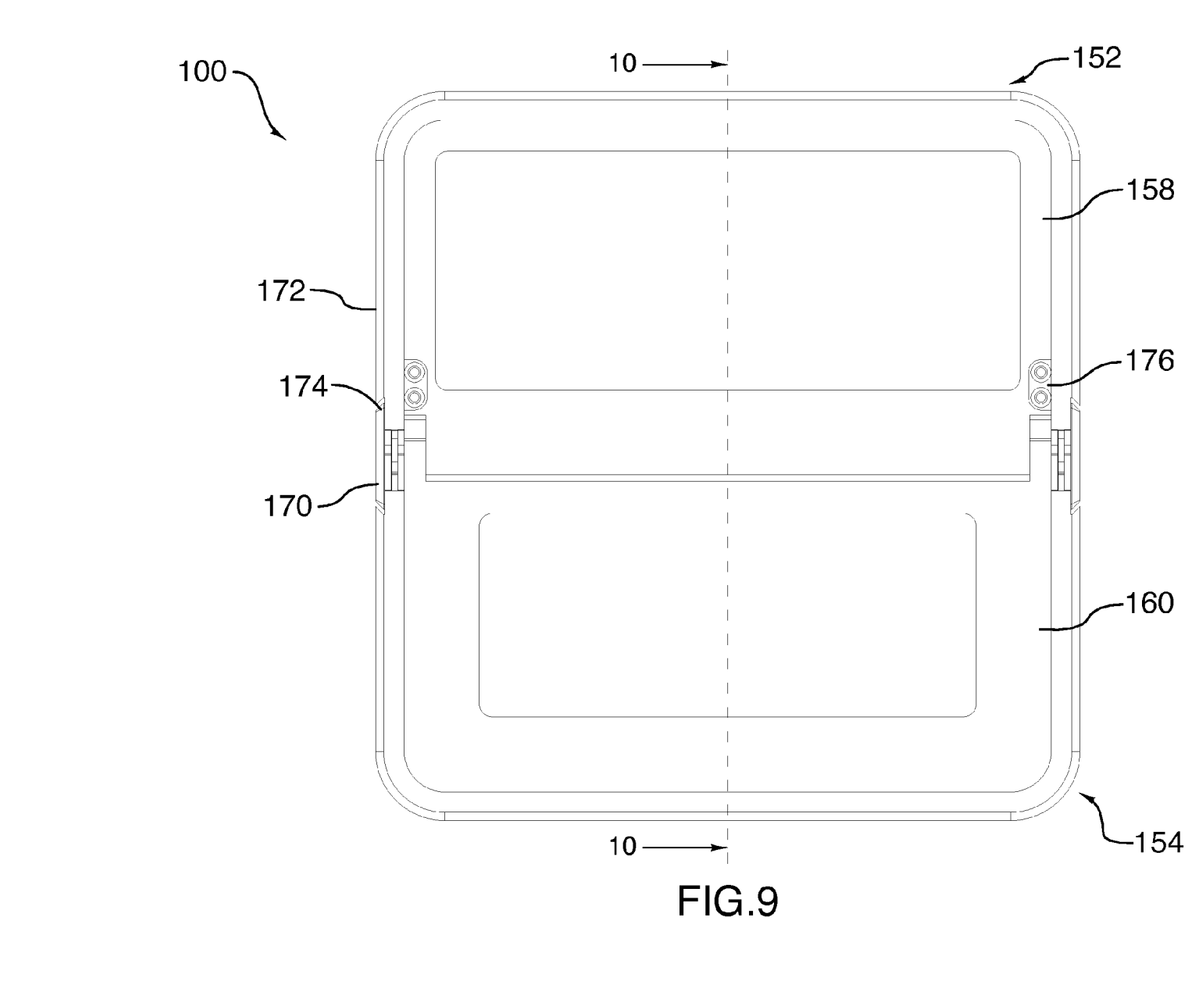
FIG. 9 is a top plan view of the mobile device in FIG. 8.
Figure 10:
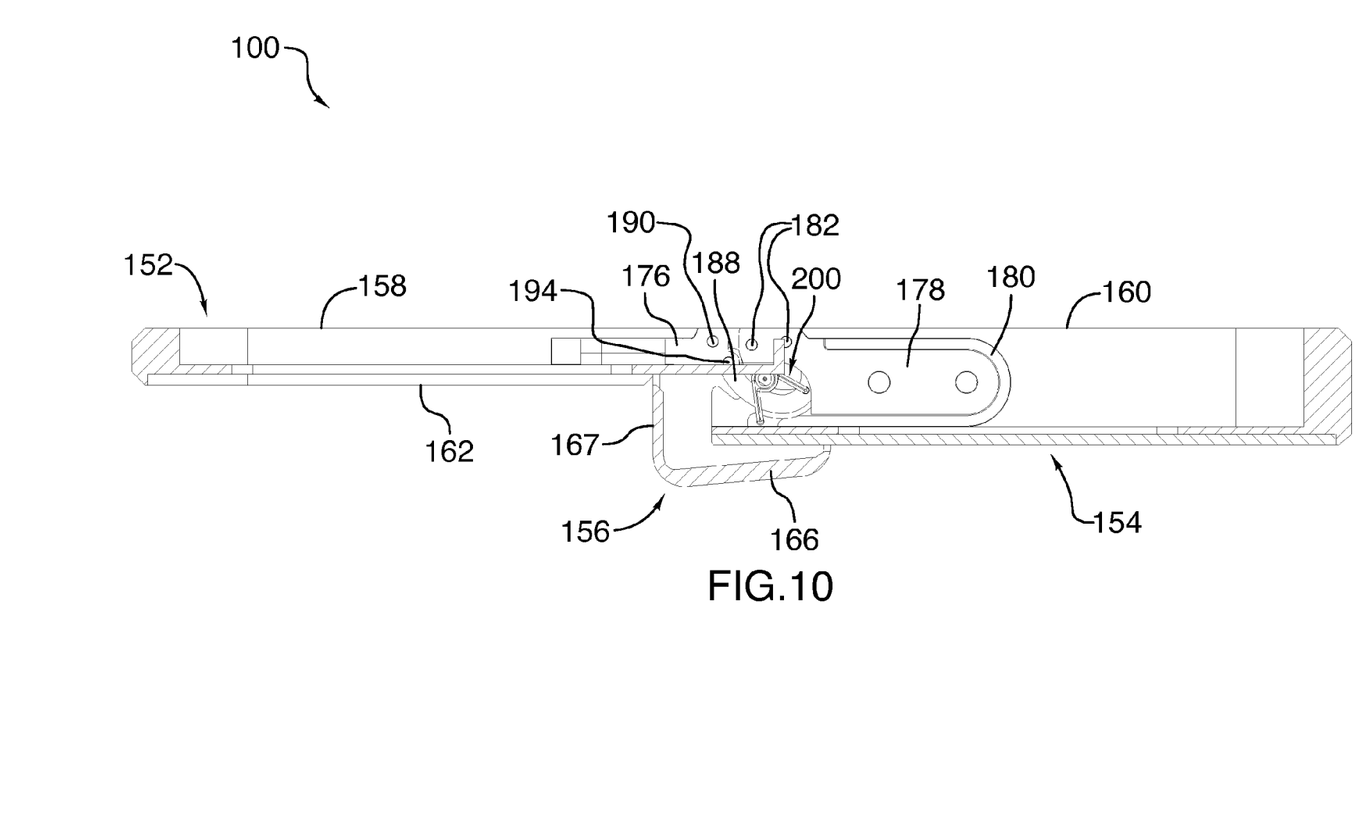
FIG. 10 is a cross-sectional side view of the mobile device taken along line 10-10 in FIG. 9 and in the direction indicated.

FIGS. 8-10 show the device 100 in the fully open configuration. As the upper housing 152 is pushed/rotated past the intermediate configuration, the linkage bar 188 continues to pivot about its corresponding pivot axis defined by its pin 182, driving the first end 202 of the spring 200 further along the clearance slot defined by the groove 198. Furthermore, as the device 100 moves past the intermediate configuration, the linkage rod 186 continues to pivot about its corresponding pivot axis defined by its pin 182 until the rod is substantially parallel with both the first and second linkage arms 176, 178. When the device is in the fully open configuration, the spring 200 is again in the tension state, maintaining the fully open configuration. Although not shown in the present example, it is contemplated that the link arm assembly 168 could further include a stop or detent mechanism that will lock the device 100 into the open configuration, although such a mechanism is not required.

When the device 100 is in the open configuration, the inner faces 158, 160 of the upper and lower housings 152, 154 are substantially flush and planar with each other, as seen in FIG. 10. In other words, the upper and lower housings 152, 154 define an angle of approximately 180° relative to each other.

To move the device from the open configuration back to the closed configuration, the same steps as described are followed, but in reverse. Accordingly, they will not be described in any detail herein.

As described above, the movement of the device 100 between the open and closed configurations is controlled primarily by the linkage rod 186 and the linkage bar 188, and their corresponding pivot axes (defined by their pivotal movement about their respective pins 182). Due to the corresponding shapes of the linkage rod 186 and the linkage bar 188 and the locations of their respective pivot axes, the rod and bar (and accordingly also the first and second linkage arms 176, 178) do not interfere with each other during opening or closing of the device 100, enabling the device 100 to be opened and closed in a controlled manner. Another benefit of the present hinge assembly 156 is that the gap 164 is configured to remain substantially the same during opening and closing of the device.

The present hinge assembly 156 is configured for providing a clamshell-style device that when in the open configuration, results in upper and lower housings 152, 154 that are substantially planar and flush with each other and that define a substantially 180° angle relative to each other. As described in detail above, the present device 100 is configured such that when the device is in the open configuration, the upper and lower housings 152, 154 do not overlap each other, and therefore the size of the input devices (i.e., keyboards, display screens, touch displays) can be of larger size without increasing the overall size of the device. This is in contrast to some conventional clamshell-type devices, where one of the input devices is limited in size due to one of the housings overlapping the other when the device is in the open configuration. Further, in the present hinge assembly 156, the gap 164 defined between the upper and lower housings 152, 154 is minimized relative to some conventional clamshell mobile devices and remains substantially constant during opening and closing of the device. Accordingly, a single input device (such as a touch sensitive display) could extend from one of the housings across the hinge assembly and further onto the other of the housings, thereby providing a single, large display area without increasing the overall size of the device. The present hinge assembly 156 is also hidden from view by the end caps and spines, thus providing an aesthetically pleasing and streamlined appearance to the device.

While a particular embodiment of the present mobile device has been described herein, it will be appreciated by those skilled in the art that changes and modifications may be made thereto without departing from the disclosure in its broadest aspects and as set forth below in the appended claims.

The invention claimed is:

1. A mobile device comprising:
   a first housing;
   a second housing; and
   a hinge assembly rotatably coupling the first housing to the second housing and enabling movement of the device between an open configuration and a closed configuration, the hinge assembly including a pair of link arm assemblies each including a first linkage arm configured for engaging the first housing and a second linkage arm configured for engaging the second housing, the first and second linkage arms being parallel and adjacent one another when the device is in the closed configuration and collinear with one another when the device is in the open configuration;
   wherein when the device is in the open configuration, the first housing is planar with the second housing.

2. The mobile device of claim 1 wherein the first housing includes an inner face and the second housing includes an inner face such that in the open configuration, the first housing inner face is arranged at 180 degree relative to the second housing inner face.

3. The mobile device of claim 1 further including at least one input device provided on the first and second housings.

4. The mobile device of claim 3 wherein the input device includes a display provided on the first housing inner face.

5. The mobile device of claim 3 wherein the input device includes a keyboard provided on the second housing inner face.

6. The mobile device of claim 2 wherein the first housing includes an outer face opposite the first housing inner face and having a display.

7. The mobile device of claim 1 wherein the hinge assembly further includes a spine and a pair of end caps provided on either end of the spine.

8. The mobile device of claim 7 wherein each link arm assembly further includes:
   a linkage rod;
   a linkage bar; and
   a biasing member configured for engaging said linkage bar;
   wherein the link arm assembly is configured for enabling movement of the device between the closed and open configurations.

9. The mobile device of claim 8 wherein the biasing member is a spring.

10. The mobile device of claim 1 further including a gap defined between said first and second housings and having a thickness, said thickness remaining substantially constant whether said device is in the open or the closed configuration.

11. A mobile device comprising:
   a first housing;
   a second housing; and
   a hinge assembly rotatably coupling the first housing to the second housing and enabling movement of the device between an open configuration and a closed configuration, the hinge assembly including at least one link arm assembly comprising:
a first linkage arm;
a second linkage arm;
a linkage rod connecting said first linkage arm and said second linkage arm;
a linkage bar configured for engaging said first linkage arm and said second linkage arm; and
a biasing member configured for engaging said linkage bar;
wherein the first and second linkage arms are parallel and adjacent one another when the device is in the closed configuration and collinear with one another when the device is in the open configuration and further wherein when the device is in the open configuration, the first housing is planar with the second housing.

12. The mobile device of claim 11 wherein the input device includes a display provided on one of said first and said second housing; and a keyboard provided on the other of said first and said second housing.

13. The mobile device of claim 11 wherein the first housing includes an inner face and the second housing includes an inner face such that in the open configuration, the first housing inner face is arranged at 180 degree relative to the second housing inner face.

14. The mobile device of claim 11 further including a gap defined between said first and second housings and having a thickness, said thickness remaining substantially constant whether said device is in the open or the closed configuration.

15. A hinge assembly for a mobile device, comprising:
at least one link arm assembly comprising:
a first linkage arm;
a second linkage arm;
a linkage rod connecting said first linkage arm and said second linkage arm;
a linkage bar configured for engaging said first linkage arm and said second linkage arm; and
a biasing member configured for engaging said linkage bar;
wherein the first and second linkage arms are parallel and adjacent one another when the device is in a closed configuration and collinear with one another when the device is in an open configuration and further wherein when the device is in the open configuration, a first housing of the device is planar with a second housing of the device.

16. The hinge assembly of claim 15 wherein the hinge assembly is configured for rotatably coupling the first housing to the second housing and enabling movement of the device between the open configuration and a closed configuration.

17. The hinge assembly of claim 15 wherein the biasing member is a spring.

18. The hinge assembly of claim 15 wherein the first linkage arm is connected to the first housing, and the second linkage arm is connected to the second housing.

19. The hinge assembly of claim 15 further including a spine configured for concealing the hinge assembly.

20. The hinge assembly of claim 19 wherein the spine defines a guide slot configured for receiving a guide pin, the guide pin configured to slide within the guide slot as the device moves from the open configuration to the closed configuration.

* * * * *